United States Patent
Cornett, Jr. et al.

(10) Patent No.: US 9,999,043 B2
(45) Date of Patent: Jun. 12, 2018

(54) TECHNIQUES FOR REDUCING OVERHEAD IN A COMMUNICATIONS SYSTEM

(71) Applicant: IPR Licensing, Inc., Wilmington, DE (US)

(72) Inventors: John B. Cornett, Jr., Melbourne Beach, FL (US); Kevin P. Johnson, Palm Bay, FL (US); George R. Nelson, Jr., Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 256 days.

(21) Appl. No.: 13/674,457

(22) Filed: Nov. 12, 2012

(65) Prior Publication Data

US 2013/0064232 A1    Mar. 14, 2013

Related U.S. Application Data (63) Continuation of application No. 10/350,309, filed on Jan. 22, 2003, now Pat. No. 8,320,298.

(Continued)

(51) Int. Cl.
*H04W 72/04* (2009.01)
*H04W 28/20* (2009.01)
(Continued)

(52) U.S. Cl.
CPC ....... *H04W 72/0446* (2013.01); *H04W 28/20* (2013.01); *H04W 48/12* (2013.01);
(Continued)

(58) Field of Classification Search
CPC ......... H04W 72/1242; H04W 72/1278; H04W 84/042; H04W 28/20; H04W 28/24; H04W 72/044
(Continued)

(56) References Cited

U.S. PATENT DOCUMENTS

| 5,291,518 A | 3/1994 | Stutman |
| 5,420,864 A | 5/1995 | Dahlin et al. |

(Continued)

FOREIGN PATENT DOCUMENTS

| CN | 1192300 | 2/1998 |
| WO | 97/46044 | 12/1997 |

(Continued)

OTHER PUBLICATIONS

IEEE Standard for Local and metropolitan networks, Part 16: Air Interface for Fixed Broadband Wireless Access Systems, IEEE Std 802.16-2001 (Apr. 8, 2002).

(Continued)

*Primary Examiner* — Raj Jain
(74) *Attorney, Agent, or Firm* — Volpe and Koenig, P.C.

(57) ABSTRACT

Parallel demodulators are provided in field units. Forward and reverse channel allocation information may be broadcast to the field units in the same epoch as traffic data but on first and second channels, such as paging and traffic channels. This assures that all field units are able to receive forward and reverse channel allocation information every epoch. By having parallel demodulators in the field unit, switching between the first and second channels is avoided and channel allocation information is not lost.

15 Claims, 5 Drawing Sheets

Related U.S. Application Data (60) Provisional application No. 60/350,569, filed on Jan. 22, 2002.

(51) Int. Cl.
*H04W 48/12* (2009.01)
*H04W 28/24* (2009.01)
*H04W 28/06* (2009.01)

(52) U.S. Cl.
CPC ............ *H04W 28/06* (2013.01); *H04W 28/24* (2013.01); *H04W 72/042* (2013.01)

(58) Field of Classification Search
USPC .... 370/310.2, 314, 321, 329, 330, 337, 338, 370/341, 343, 344, 347, 442, 436, 498
See application file for complete search history.

(56) References Cited

U.S. PATENT DOCUMENTS

| | | | |
|---|---|---|---|
| 5,471,474 A | 11/1995 | Grobicki et al. | |
| 5,485,463 A | 1/1996 | Godoroja | |
| 5,521,925 A * | 5/1996 | Merakos | H04J 3/1694 370/337 |
| 5,802,046 A | 9/1998 | Scott | |
| 5,859,840 A | 1/1999 | Tiedemann, Jr. et al. | |
| 6,049,538 A | 4/2000 | Scott | |
| 6,081,721 A * | 6/2000 | Suzuki | H04W 72/044 455/450 |
| 6,285,886 B1 | 9/2001 | Kamel et al. | |
| 6,388,997 B1 | 5/2002 | Scott | |
| 6,889,050 B1 * | 5/2005 | Willars | H04L 47/10 370/329 |
| 7,020,111 B2 | 3/2006 | Ozluturk et al. | |
| 8,320,298 B2 * | 11/2012 | Cornett, Jr. | H04W 48/12 370/321 |
| 8,964,682 B2 * | 2/2015 | Mourad | H04W 72/04 370/329 |
| 2001/0030956 A1 * | 10/2001 | Chillariga | H04W 28/26 370/348 |
| 2002/0141331 A1 * | 10/2002 | Mate | H04W 72/1273 370/218 |
| 2002/0160781 A1 * | 10/2002 | Bark | H04W 72/085 455/450 |
| 2003/0060224 A1 | 3/2003 | Nelson, Jr. et al. | |
| 2003/0086393 A1 * | 5/2003 | Vasudevan | H04L 1/0006 370/330 |
| 2003/0176191 A1 * | 9/2003 | Cornett, Jr. | H04W 48/12 455/445 |
| 2003/0185166 A1 * | 10/2003 | Belcea | H04W 40/08 370/321 |
| 2013/0064232 A1 * | 3/2013 | Cornett, Jr. | H04W 48/12 370/336 |

FOREIGN PATENT DOCUMENTS

| | | |
|---|---|---|
| WO | 9967964 A1 | 12/1999 |
| WO | 01/063781 | 8/2001 |
| WO | 01/91319 A2 | 11/2001 |

OTHER PUBLICATIONS

Third Generation Partnership Project 2, "Physical Layer Standard for cdma2000 Spread Spectrum Systems," 3GPP2 C.S0002-0 Version 1.0 (Jul. 1999).

Dinan et al., "Spreading Codes for Direct Sequence CDMA and Wideband CDMA Cellular Networks," IEEE Communications Magazine (Sep. 1998).

Telecommunications Industry Association, "TIA/EIA Standard, Mobile Station-Base Station Compatibility Standard for Wideband Spread Spectrum Cellular Systems, TIA/EIA-95-B (Upgrade and Revision of TIA/EIA-95-A)," (Mar. 1999).

Third Generation Partnership Project 2, "Physical Layer Standard for cdma2000 Spread Spectrum Systems," 3GPP2 C.S0002 Version 3.0 (Jun. 2001).

Third Generation Partnership Project 2, "Physical Layer Standard for cdma2000 Spread Spectrum Systems," 3GPP2 C.S0002-A Version 5.0 (Jul. 2001).

Mouly et al., "Radio Resource Management," GSM System for Mobile Communications, pp. 308-430 (Jan. 1993).

* cited by examiner

TECHNIQUES FOR REDUCING OVERHEAD IN A COMMUNICATIONS SYSTEM

CROSS REFERENCE TO RELATED APPLICATIONS

This application is a continuation of U.S. patent application Ser. No. 10/350,309, filed Jan. 22, 2003 which claims the benefit of U.S. Provisional Application No. 60/350,569, filed Jan. 22, 2002, the entire teachings of which are incorporated herein by reference.

FIELD OF INVENTION

In a wireless telecommunications system, radio channels provide a physical link between communication units. The equipment in such a system typically includes a base station processor in communication with a network such as the Public Switched Telephone Network (PSTN), in the case of voice communications, or a data network, in the case of data communications, and one or more access terminals in communication with a plurality of end user computing devices, such as user PCs. The combination of access terminal and end user computing device may be referred to as a field unit or remote unit. The wireless channels include forward channels, for message transmission from the base station processor to the field units, and reverse channels, for message transmission to the base station processor from the field units.

In the case of a wireless data system such as may be used to provide wireless Internet access, each base station processor typically serves many field units. The wireless channels, however, are a limited resource, and are therefore allocated by a scheduler among the field units served by the base station processor. The scheduler allocates the wireless channels among the field units on a traffic demand basis.

One way of supporting on-demand access among multiple users is referred to as Time Division Multiple Access (TDMA), where each of the wireless channels are allocated to specific access terminals only for a certain number of predetermined time intervals or time slots. A second way of supporting on-demand access among multiple users is referred to as Code Division Multiple Access (CDMA), which allows multiple users to share the same radio spectrum. Instead of dividing a Radio Frequency (RF) spectrum into narrow channels (e.g. 30 kHz each in analog wireless systems), CDMA spreads many channels over a broad spectrum (1.25 MHZ in the case of the North American CDMA standard known as IS-95). To separate a particular channel from another channel using the same spectrum at the same time, a unique digital code called a pseudo-random (i.e., pseudo-noise or PN) code is assigned to each user. Many users (up to 64 for IS-95) share the same spectrum, each using their unique code, and decoders separate the codes at each end in a process similar to a tuner that separates different frequencies in more conventional systems.

The PN codes used for communication channel definitions typically have a defined code repeat period or code epoch. For each such epoch duration (also called a slot), a base station central controlling system can further schedule assignments of forward traffic channels (forward slot allocations or "FSAs") and reverse traffic channels (reverse slot allocations or "RSAs") to active field units for each epoch. This is typically done in such a way that all channels are assigned to active users as much as possible. Unfortunately, the need to assign and reassign PN code channels among a large number of users can introduce delays. In particular, when a PN code is reassigned to a different user connection, it typically takes a determined period of time for the code demodulators in the receiver to lock in the new code. This in turn introduces latency in the reception of the data packets that must travel on the coded channel.

To coordinate traffic channels, the base station processor communicates with a given field unit in the following manner. First, the base station processor checks to make sure there is an available channel. Second, the base station processor sends a message to the given field unit to set up the available channel. The given field unit processes the message (2-3 slots) to set-up the channel and sends an acknowledgment (1-2 slots) confirming set-up complete. To tear down the channel, the base station processor sends a message to the given field unit, which processes the command (1-2 slots) and sends back an acknowledgment (1-2 slots).

SUMMARY OF THE INVENTION

Setting up traffic channels cost several Time Division Multiplexed (TDM) time slots ("TDM slots") of overhead, and tearing down the traffic channel costs additional TDM slots of overhead. To reduce this costly overhead, the principles of the present invention improve channel switching speed (i.e., reduce overhead to as low as no overhead), which, in turn, improves channel utilization in a communications system, such as a demand access packet switched CDMA communications system. This is accomplished by broadcasting from a base station forward and reverse channel allocation information every TDM slot on a separate paging channel and by having all field units able to demodulate the paging channel allocation information in parallel with demodulating forward traffic channel information.

The broadcasting may occur every TDM slot, which ensures that all field units are able to receive forward and reverse channel allocation information every TDM slot, which may significantly improve utilization. In other words, if demand exists, all channel codes can be assigned every TDM slot based on user backlogs, thereby limiting idle time loss to partially filled TDM slots.

By having parallel demodulators for both the paging and forward traffic channels in the field units, switching the demodulators between paging channels and forward traffic channels is avoided. This prevents control messages from being mis-detected or even becoming lost while the field units switch between channels. It also means the uncertainty of knowing when the field units switch back to listen to the paging channel is eliminated. Further, receiving control information on the paging channel is typically more robust when the forward traffic channels are sent with less power and coding gain.

The channel/slot assignments may be pipelined from the base station to the field unit demodulators such that the actual traffic channel transmissions can begin a fixed number of TDM slots after receiving the assignment. This parallel process keeps the channels fully utilized and allows for pipelining of the data over the paging channel without interruption.

These features can significantly improve channel utilization when there are many more field units requesting channels than there are channels available. Using this feature can boost overall channel utilization from 20-30% to about 90% or more. In one embodiment, this invention can be used in link layer software on base station and field units to improve switching and channel utilization.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of preferred embodiments of the invention follows.

Figure 1:
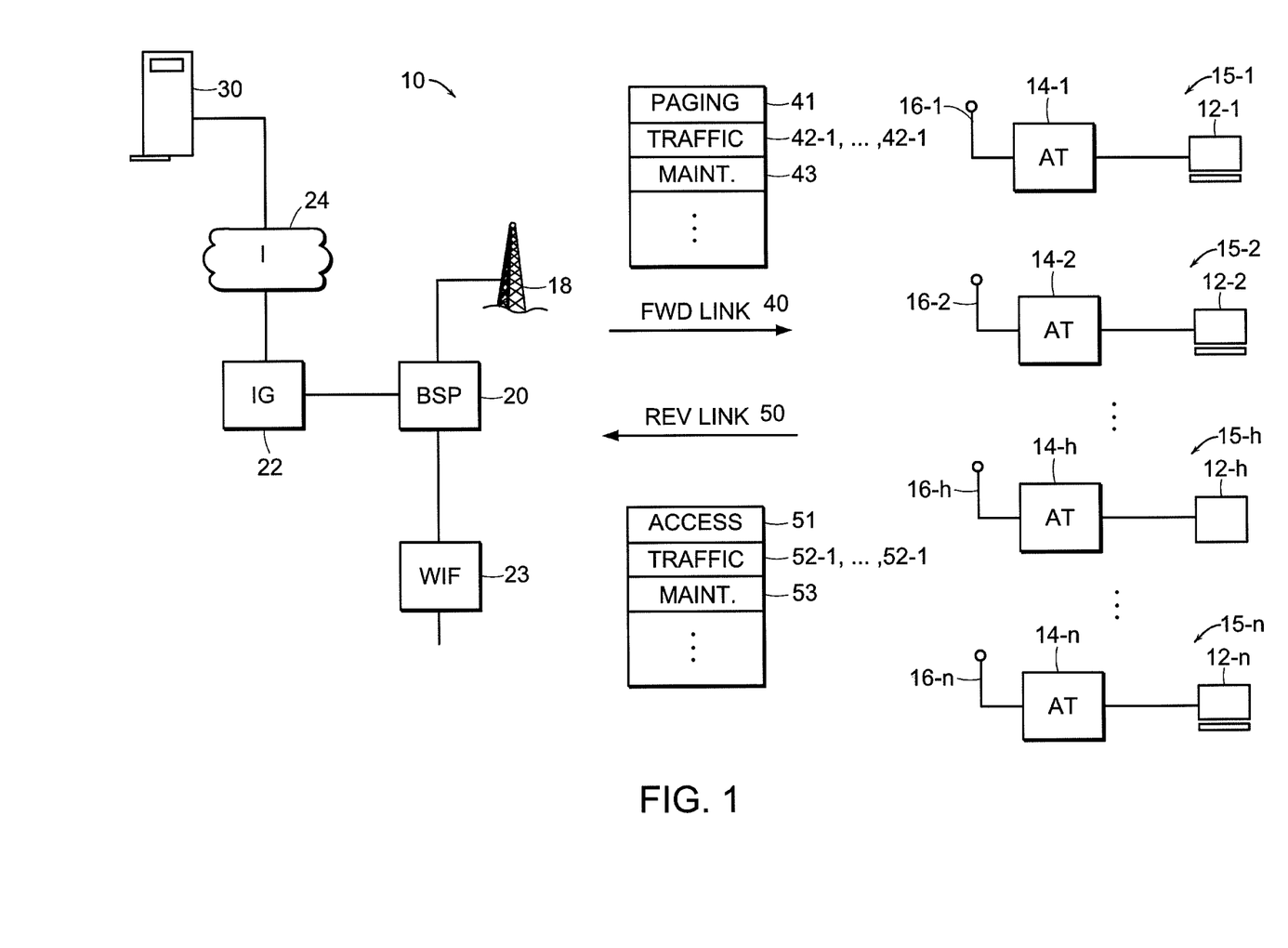
FIG. 1 is a block diagram of a communications system in which access is granted to a shared communications media on a code division multiplexed basis.

FIG. 1 is a block diagram of a communications system 10 that makes use of Code Division Multiple Access (CDMA) to allow multiple transmitters and receivers to share access to a common channel resource by using codes to distinguish the transmitters and receivers from one another. In the following description, the communications system 10 is described such that the shared channel resource is a wireless or radio channel. However, it should be understood that the techniques described herein may be applied to allow shared access to other types of media, such as telephone connections, computer network connections, cable connections, and other physical media to which access is granted on a demand driven basis by a centralized controller.

The communications system 10 includes a number of data processing devices, such as personal computers (PCs), Personal Digital Assistants (PDAs), data enabled mobile phones or the like (collectively the PCs) 12-1, 12-2, . . . 12-h, . . . 12-n, corresponding Access Terminals (ATs) 14-1, 14-2, . . . 14-h, . . . 14-n, and associated antennas 16-1, 16-2, . . . 16-h, . . . 16-n. The PCs 12 maybe connected to a respective AT 14 through a suitable wired connection, such as an Ethernet-type connection, or the ATs 14 may be built into the PCs 12. Collectively, the PCs 12, ATs 14, and associated antennas 16 are referred to as field units 15-1, 15-2, . . . 15-h, . . . 15-n. Centrally located equipment includes a base station antenna 18 and a base station processor (BSP) 20.

The BSP 20 provides connections to and from an Internet gateway 22, the Internet 24, and network file server 30. The communications system 10 is a demand access, point to multi-point, wireless communications system such that the field units 15 may transmit data to and receive data from a network server 30 through bi-directional wireless connections implemented over forward links 40 and reverse links 50. It should be understood that in a point to multi-point, multiple access, wireless communications system 10 as shown, a given base station processor 20 typically supports communications with a number of different field units 15 in a manner that is similar to a cellular telephone communications network.

Within the field units 15, the ATs 14 permit associated PCs 12 to be connected to the network file server 30. In the reverse link direction, that is, for data traffic traveling from the PCs 12 towards the network file server 30, the PCs 12 provide an Internet Protocol (IP) level packet to the ATs 14. The ATs 14 then encapsulates the wired framing with appropriate wireless connection framing. The appropriately formatted wireless data packet then travels over one of the radio channels that compose the reverse link 50 through the antennas 16 and 18. At the central base station location, the BSP 20 then extracts the radio link framing, reformatting the packet in IP form, and forwards it through the Internet gateway 22. The packet is then routed through any number and/or any type of IP networks, such as the Internet 24, to its ultimate destination, such as the network file server 30.

Data may also be transmitted from the network file server 30 to the PCs 12 in a forward direction. In this instance, an Internet Protocol (IP) packet originating at the file server 30 travels through the Internet 24 through the Internet gateway 22 arriving at the BSP 20. Appropriate wireless protocol framing is then added to the IP packet. The packet then travels through the antennas 18 and 16 to the intended receiver AT 14. The receiving AT 14 decodes the wireless packet formatting and forwards the packet to the intended PC 12, which performs the IP layer processing.

A given PC 12 and the file server 30 can therefore be viewed as the end points of a duplex connection at the IP level. Once a connection is established, a user at the PC 12 may transmit data to and receive data from the file server 30.

As will be described in greater detail later, the reverse link 50 is actually composed of a number of different types of logical and/or physical radio channels, including an access channel 51, multiple traffic channels 52-1, . . . 52-t, and a maintenance channel 53. The reverse link access channel 51 is used by the ATs 14 to send messages to the BSP 20 to request that traffic channels be granted to them. The assigned traffic channels 52 then carry payload data from the ATs 14 to the BSP 20. It should be understood that a given IP layer connection may actually have more than one traffic channel 52 assigned to it. In addition, a maintenance channel 53 may carry information such as synchronization and power control messages to further support transmission of information over the reverse link 50.

Similarly, the forward link 40 typically includes a paging channel 41. The paging channel 41 is used by the BSP 20 not only to inform a given field unit 15 that forward link traffic channels 52 have been allocated to it, but also to inform the given field unit 15 of allocated traffic channels 52 in the reverse link 50 direction. Traffic channels 42-1 . . . 42-t on the forward link 40 are then used to carry payload information from the BSP 20 to the field units 15. Additionally, maintenance channels carry synchronization and power control information on the forward link 40 from the base station processor 20 to the field units 15.

The traffic channels 42 on the forward link 40 are shared in a Code Division Multiplex manner among a number of the field units 15. Specifically, the forward link traffic channels 42 support a pre-determined number of field units 15 through the use of unique codes to allow multiple code channels use of the same spectrum. It should be understood that a given field unit 15 may, at any instant in time, have multiple codes (i.e., channels) assigned to it or at other times may have no codes at all assigned to it.

The allocation of codes occurs on a demand basis among the various field units 15 in a physical area serviced by the system 10. The code assignments are typically determined by the base station processor 20, which is coordinating the assignment of resources to specific connections between users of the computers 12 and servers 30. These assignments are made based upon a number of factors, such as traffic demand, requested quality of service, and other factors.

The manner of assignment of a specific code to a specific one of the field units 15 is not of importance to the present invention. Rather, the present invention is concerned with the manner in which a receiver, such as an AT 14, receives coded data on the forward link in a manner that improves channel switching speed that, in turn, improves channel utilization in the communications system 10.

Figure 2:
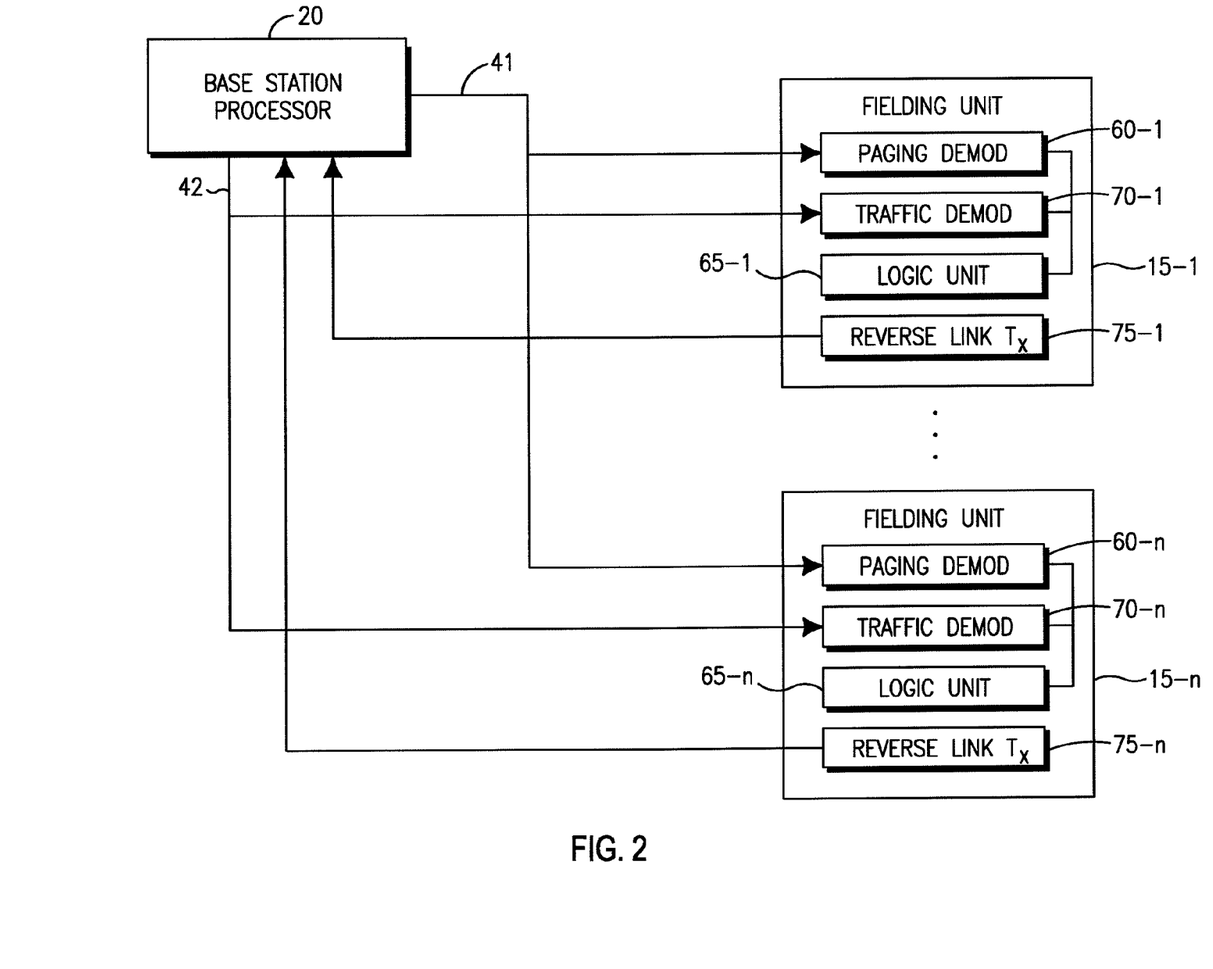
FIG. 2 is a block diagram of the base station and field units of FIG. 1 in which the field units have a paging demodulator and a traffic demodulator in parallel.

FIG. 2 is a block diagram showing the relationship between the base station processor 20 and the field units 15-1, . . . , 15-n, which includes the combination of antenna 16, AT 14, and PC 12. The base station processor 20 may include multiple demodulators (not shown). The field units 15 each include a paging demodulator 60, traffic demodulator 70, logic unit 65, and reverse link transmitter 75.

With the two demodulators operating at the same time, the field units 15 are able to receive paging and traffic data in parallel. Thus, the base station processor 20 is able to broadcast forward and reverse channel allocation information as often as necessary, including every Time Division Multiplexed (TDM) slot, on a separate paging channel at the same time it transmits forward traffic. This ensures that all mobile units are able to receive forward and reverse channel allocation information every TDM slot.

By having the parallel demodulators 60 and 70 in the field units 15, switching a demodulator between paging channels and forward traffic channels is avoided. This prevents control messages from getting lost when the AT 14 switches between traffic and paging channels, which occurs in the prior art. It also means the uncertainty of knowing when the AT 14 switches back to listen to the paging channel is eliminated. The ability to demodulate traffic signals and channel allocation commands as much as every TDM slot means that all forward and reverse channels can be utilized every TDM slot, which significantly improves utilization.

The field units 15 may also include a logic unit 65, such as a general purpose or application specific processor, to determine whether the TDM slot allocation control data is specified for the field unit 15 and, if yes, to set up at least one traffic TDM slot in at least one traffic channel according to the TDM slot allocation control data. The traffic channel(s) allow traffic data to be communicated between the base station processor 20 and the field unit 15 in the forward link and/or reverse link.

Figure 3:
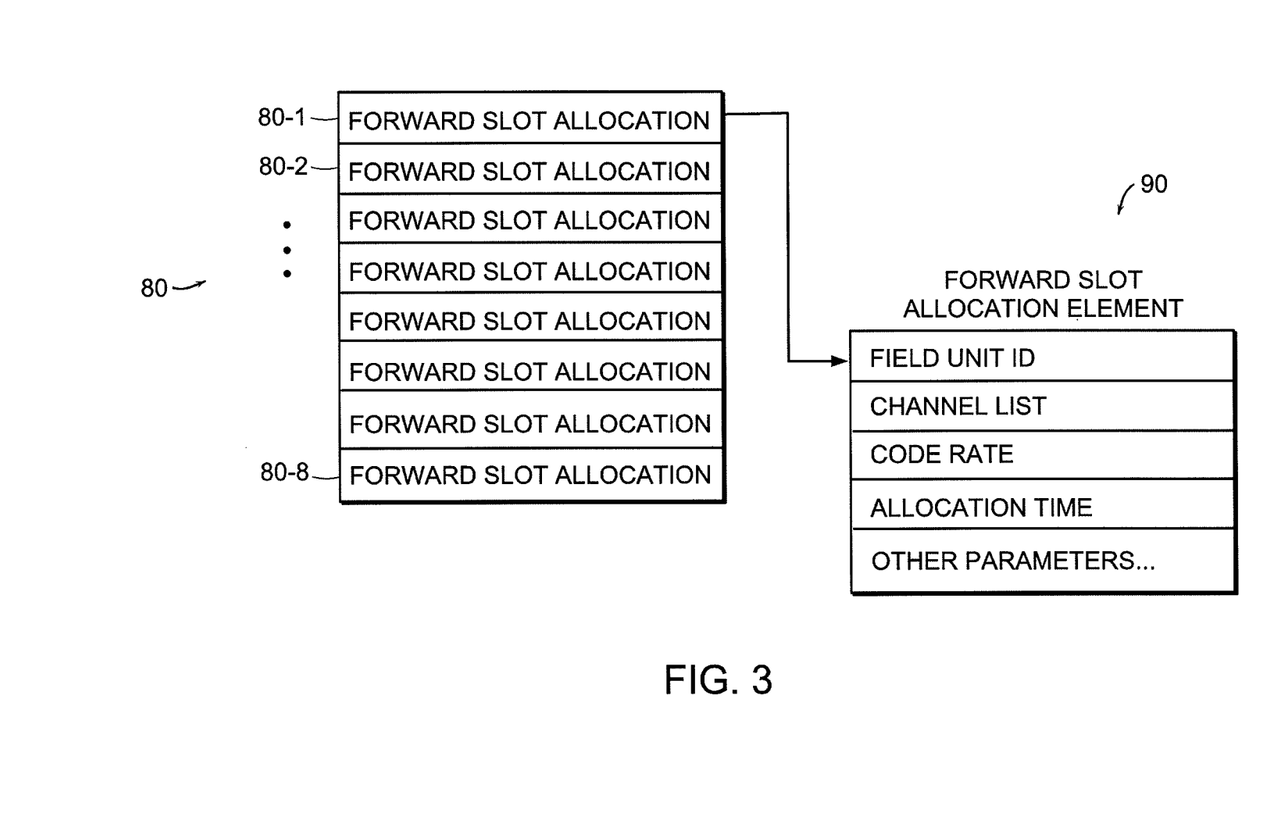
FIG. 3 is a data structure diagram for the forward link TDM slot assignments of FIG. 2.

FIG. 3 shows a relationship between a forward slot allocation structure 80 and a forward slot allocation element 90. The forward slot allocation structure 80 includes forward slot allocations 80-1, 80-2, . . . , 80-8. Each forward slot allocation 80-1, 80-2, . . . , 80-8 includes a forward slot allocation element 90 (i.e., record) that contains the information (i.e., TDM slot allocation control data) with regard to which field unit 15-1, . . . , 15-n is using that allocation. Each forward slot allocation element 90 includes the field unit ID, channel list (i.e., channel codes, which could be more than one, such as two, four, or six channel codes), Forward Error Correction (FEC) code rate, allocation time (i.e., number of slots), and other parameters (e.g., power control). Thus, the channel list may designate a given field unit 15 to have more than a single code channel over which the base station processor 20 and given field unit 15 communicate forward traffic data.

Figure 4:
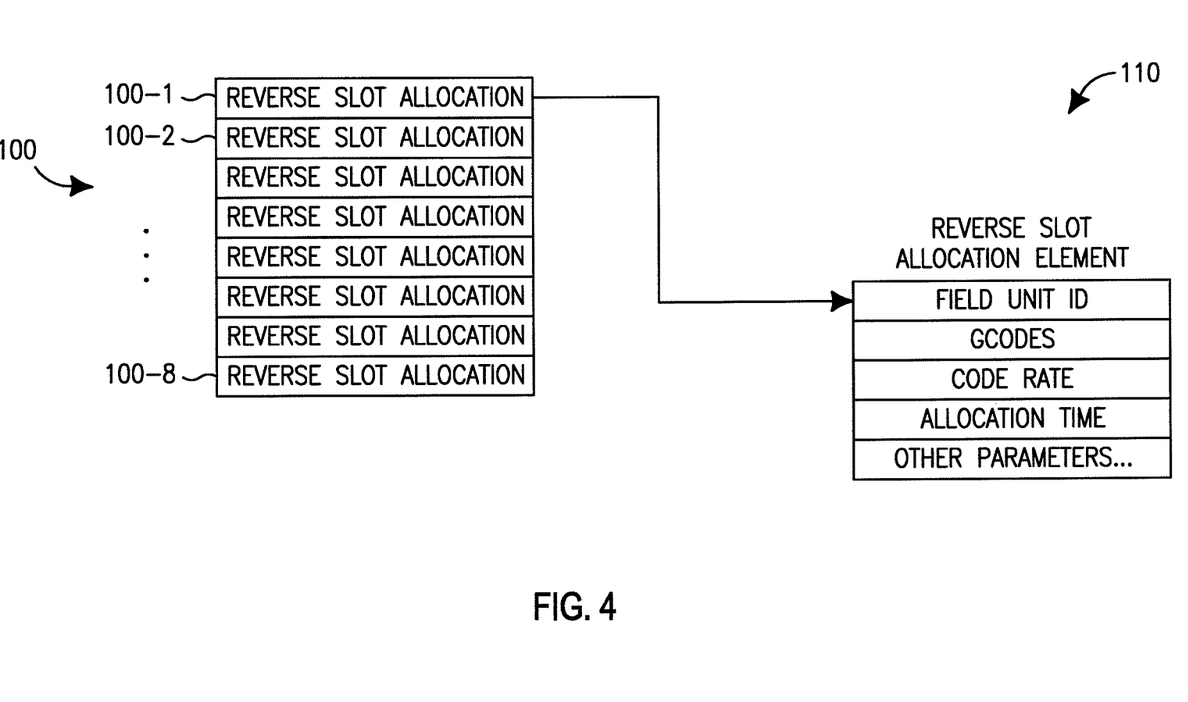
FIG. 4 is a data structure diagram for the reverse link TDM slot assignments of FIG. 2.

FIG. 4 shows the relationship between a reverse slot allocation structure 100 and a reverse slot allocation element 110. The reverse slot allocation structure 100 includes reverse slot allocations 100-1, 100-2, . . . , 100-8. Each reverse slot allocation 100-1, 100-2, . . . , 100-8 includes a reverse slot allocation element 110 (i.e., record) that contains the information (i.e., slot allocation control data) with regard to which field unit 15-1, . . . , 15-n is assigned that allocation. Each reverse slot allocation element 110 includes a field unit ID, codes (such as Gold codes ("Gcodes")), code rates, allocation time, and other parameters. The usage of the reverse slot allocation information is the same as for the forward slot allocation information but for the reverse link direction.

In both the forward and reverse allocation cases, the base station processor 20 may broadcast the forward and reverse slot allocation elements 90 and 110, respectively, over the paging channel every TDM slot. Each field unit 15 looks for its ID in a subset of all of the elements 90, 110 in the forward slot and reverse slot allocation structures 80, 100, respectively, and, if a match is found, configures its forward/reverse channel receivers/transmitters to receive/send traffic, respectively, according to the received information. Because the field units 15 can demodulate both paging and forward traffic in parallel, as provided by the embodiment of FIG. 2, each field unit 15 can look at the broadcast data on the paging channel every TDM slot, whether or not it is receiving traffic data.

The forward or reverse TDM slot allocation control data may also include data for deallocating forward or reverse channels, respectively. Deallocating forward or reverse channels may be based on a channel performance parameter, including, for example, at least one of the following: fading, packet loss rate, Carrier-to-Interference (C/I) ratio, Signal-to-Noise (S/N) ratio, or power level.

Figure 5:
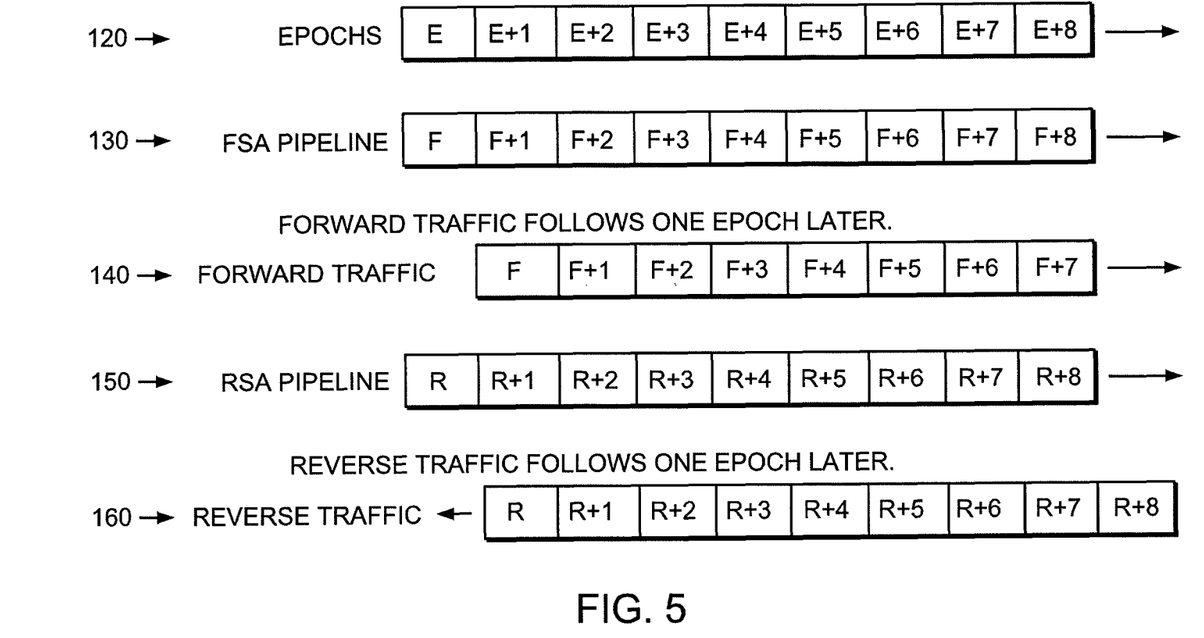
FIG. 5 is a timing diagram of data traffic in the forward and reverse links in the system of FIG. 1.

FIG. 5 is a timing diagram showing the forward and reverse slot allocations 80, 100 as they are pipelined to the field units 15. A series of epochs 120 provides a baseline from which to base the timing of the forward slot allocations 80 and reverse slot allocations 100 pipelines 130, 150. The forward slot allocation pipeline 130 is sent by the base station processor 20 to the field units 15 on the paging channel 41.

Similarly, the reverse slot allocation pipeline 150 is sent from the base station processor 20 to the field units 15 on the paging channel 41. Because the data provided in the FSA pipeline 130 and RSA pipeline 150 can be demodulated and decoded by the field units 15 in one TDM slot, the forward traffic 140 and reverse traffic 160 corresponding to the data in the FSA and RSA pipelines 130, 150 can follow one TDM slot later. It should be noted that there may be another pipeline stage (not shown) between when the allocation message is sent on the forward paging channel to when the forward traffic channel starts.

As indicated by the timing in FIG. 5, the FSA pipeline 130 and RSA pipeline 150 continues in parallel with the forward traffic 140 and reverse traffic 160. This, as discussed above, is possible because of the parallel paging demodulators 60 and traffic demodulators 70 (FIG. 2) in each of the field units 15. Thus, pipelining the data over the paging channel 41 continues without interruption such that all channels can be multiplexed to each field unit 15 every TDM slot. A significant improvement in channel utilization is experienced, particularly when there are many more field units 15 requesting channels than there are channels available. Using this feature can boost overall channel utilization from 20-30% to about 90% or more.

In one embodiment, the teachings above can be used in link layer software on base station processor 20 and field units 15 to improve switching and channel utilization. This can be used in any form of CDMA packet switched communications system.

The software may be stored in RAM, ROM, magnetic or optical disk, loaded by a processor, and executed by that processor. The software may be distributed in physical media or transferred to the base stations 20 and field units 15 via wire or wireless networks. The software is not limited to a particular software language and may be loaded at each run time or stored permanently in the base station processor 20 or field units 15 in the form of firmware.

While this invention has been particularly shown and described with references to preferred embodiments thereof, it will be understood by those skilled in the art that various changes in form and details may be made therein without departing from the scope of the invention encompassed by the appended claims.

What is claimed is:

1. A mobile device configured to receive and transmit data in allocated time intervals, wherein each time interval includes at least one forward link control channel and a forward link shared channel, the mobile device comprising:
    a receiver configured to receive control information in the at least one forward link control channel of a first time interval, wherein the control information is associated with forward link shared channel allocations of resources and reverse link shared channel allocations of resources;
    the receiver further configured to receive data based on the control information indicating that forward link shared channel resources are allocated to the mobile device; and
    a transmitter configured to transmit data, based on the control information indicating that reverse link shared channel resources are allocated to the mobile device, in a second time interval that is a fixed number of time intervals after the first time interval.

2. The mobile device of claim 1, wherein each time interval includes at least one time slot.

3. The mobile device of claim 1, further comprising:
    a processor further configured to determine whether an identification of the mobile device is present in the control information.

4. The mobile device of claim 1, wherein the control information for the mobile device further includes power control information.

5. The mobile device of claim 1, wherein the data is IP packet data.

6. A method for use in a mobile device configured to receive and transmit data in allocated time intervals, wherein each time interval includes at least one forward link control channel and a forward link shared channel, the method comprising:
    receiving, by a receiver, control information in the at least one forward link control channel of a first time interval, wherein the control information is associated with forward link shared channel allocations of resources and reverse link shared channel allocations of resources;
    receiving, by the receiver, data based on the control information indicating that forward link shared channel resources are allocated to the mobile device; and
    transmitting, by a transmitter, data, based on the control information indicating that reverse link shared channel resources are allocated to the mobile device, in a second time interval that is a fixed number of time intervals after the first time interval.

7. The method of claim 6, wherein each time interval includes at least one time slot.

8. The method of claim 6, further comprising:
    determining, by a processor, whether an identification of the mobile device is present in the control information.

9. The method of claim 6, wherein the control information for the mobile device further includes power control information.

10. The method of claim 6, wherein the data is IP packet data.

11. A base station configured to allocate resources in time intervals, wherein each time interval includes at least one forward link control channel and a forward link shared channel, the base station comprising:
    a transmitter configured to transmit control information in the at least one forward link control channel of a first time interval, wherein the control information is associated with forward link shared channel allocations of resources and reverse link shared channel allocations of resources;
    the transmitter further configured to transmit data to a mobile device based on the control information indicating that forward link shared channel resources are allocated to the mobile device; and
    a receiver configured to receive data from the mobile device, based on the control information indicating that reverse link shared channel resources are allocated to the mobile device, in a second time interval that is a fixed number of time intervals after the first time interval.

12. The base station of claim 11, wherein each time interval includes at least one time slot.

13. The base station of claim 11, wherein the control information for the mobile device includes an identification of the mobile device.

14. The base station of claim 11, wherein the control information for the mobile device further includes power control information.

15. The base station of claim 11, wherein the data is IP packet data.

* * * * *